Figure 1:
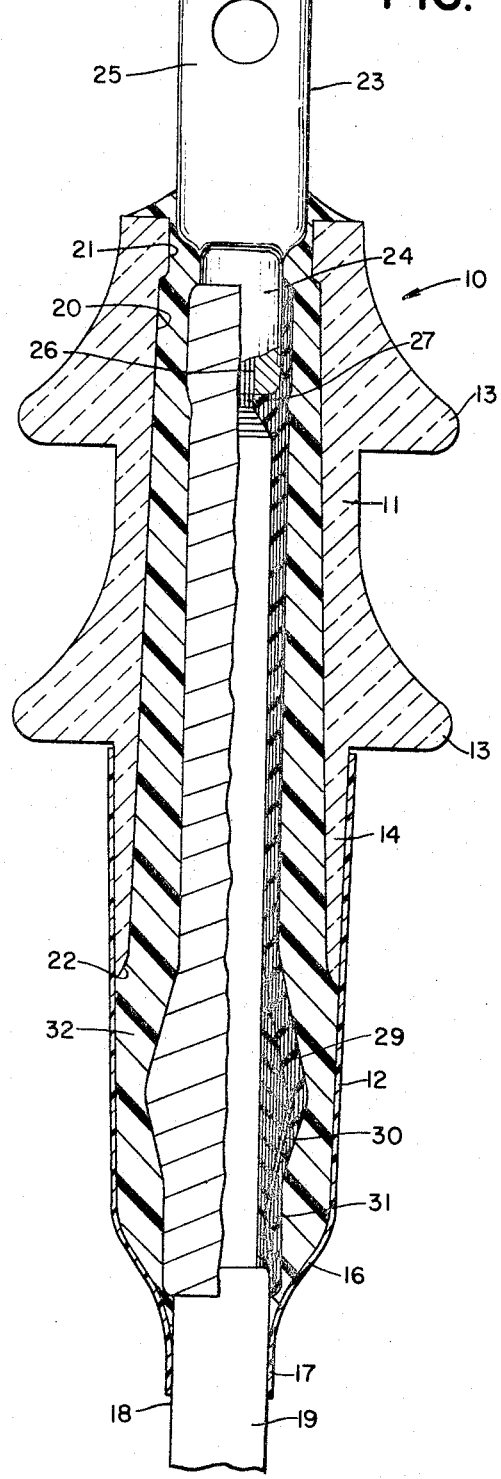

July 4, 1967     E. O. JUHLIN ET AL     3,329,765

HIGH VOLTAGE ELECTRICAL CABLE TERMINATIONS

Filed July 23, 1964

INVENTORS
ERIC O. JUHLIN
GERARD J. DIAZ
JOHN H. GONDER
ANDREW C. LAIRD

BY

ATTORNEYS

United States Patent Office 3,329,765
Patented July 4, 1967

3,329,765
HIGH VOLTAGE ELECTRICAL CABLE TERMINATIONS
Eric O. Juhlin, Gerard J. Diaz, John H. Gonder, and Andrew C. Laird, Hastings on Hudson, N.Y., assignors to Anaconda Wire and Cable Company, New York, N.Y., a corporation of Delaware
Filed July 23, 1964, Ser. No. 384,756
7 Claims. (Cl. 174—76)

This invention relates to a high voltage electrical cable termination and, more particularly, it relates to the use of epoxy resins in a pothead for terminating an electrical cable.

Potheads for terminating high voltage electrical cable generally consist of a hollow insulator and a metallic entrance sleeve. The terminal portion of the cable is inserted into the pothead through the entrance sleeve which is sealed to the cable surface and forms jointly with the hollow insulator an internal chamber surrounding the terminal section of the cable. The insulator is capped and a connector in electrical contact with the end of the cable protrudes out of the insulator cap. A dielectric material, such as hydrocarbon oil or asphalt, is used to fill the internal chamber. A sealing device is required on the entrance sleeve to prevent the leakage of the dielectric material. The metallic entrance sleeve and the insulator are joined together either by soldering, cementing, or with nuts and bolts to provide a tight seal.

The potheads of this type are installed and used indoors and outdoors and subject to temperature variations depending on the locality where the pothead is installed. For a thermoplastic dielectric material used in the pothead, the hot sun in the summer months usually is sufficient to cause the expansion of this material to overflow or break the seal and subsequently leak out which causes electrical failure in the cable terminal.

Thermosetting resins that will not soften under the hot sun and have high dielectric strength and low thermal expansion properties have been suggested as a possible replacement for the thermoplastic dielectric material. Among the various thermosetting resins, epoxy resin appears to be most desirable due to its high adhesion for ceramic, glass, and metallic surfaces, its high dielectric strength, and its inertness to acids, alkalies, and organic solvents. However, in the actual field installation, the excellent adhesion of the epoxy resin to the ceramic surface may cause cracking due to the slight shrinkage during its curing. Further, in field installation, a bubble-free casting is extremely difficult to obtain even with a relatively low viscosity resin. Bubbles entrapped by the cured epoxy resin lowers the dielectric strength of the pothead and is extremely undesirable in high voltage cable installation. While many suggestions have been advanced in the past to overcome these difficulties, epoxy resin has not been successfully used as a dielectric material in a pothead for terminating power cables.

We have now found that a low viscosity epoxy resin can be advantageously used in a pothead for terminating a high voltage power cable. Broadly stated, the pothead of this invention comprises an insulator having an axial bore extending therethrough and surrounding the end portion of the cable, and a flexible resinous sleeve surrounding a portion of the cable immediately adjacent to the end portion of the cable. This sleeve has a tapered end which is adapted to engage the periphery of the cable and an opposite end which is connected to the insulator. The sleeve and the insulator jointly form a chamber surrounding the terminal section of the cable. A connector is connected to the end of the cable and at least a portion of this connector protrudes out of the insulator. The chamber surrounding the cable is filled with a substantially void free exothermically cured low viscosity epoxy resin which bonds the cable, the sleeve, and the insulator into an integral unit.

By sucessfully using an epoxy resin as a dielectric material for the pothead, we are able to overcome the difficulties commonly associated with conventional potheads. In addition, the provision of a sealing device in the pothead can be completely eliminated, and the expensive joints that require precision machining and fabricating become unnecessary. The high adhesion of the epoxy resin bonds all the components to form a complete integral and substantially void free unit, which further eliminates the problem of power failure due to the breakage of the ceramic insulator.

In accordance with this invention, the method for terminating a power cable with an epoxy filled pothead becomes a comparatively easy task. The pothead used for the termination has an electrical conductive sleeve connected to an insulator. The sleeve has a tapered end for engaging the periphery of the cable and serves as an entrance for the pothead. The insulator has a substantially cylindrical axial bore extending therethrough and forms an internal chamber with the connected sleeve. The free end of the insulator serves as the exit for the cable with its connector. Broadly stated, this method comprises the steps of connecting a connector to the end of the power cable, inserting the connector and a sufficient length of the terminal section of the cable into the pothead through its entrance, and allowing at least a portion of the connector to protrude out of the pothead exit. The pothead is maintained in vertical position with its exit in the upper position, and filled with a low viscosityl epoxy resin. The resin is cured in a progressively upward fashion allowing the entrapped gas to escape through the exit to provide a substantially void free integral unit.

In actual field installation, several alternative steps may be performed. For a high voltage cable, it is generally necessary to provide a stress relief cone on the terminal section of the cable. For such practice, it is preferred to insert the terminal portion of the cable through the sleeve first. After the stress relief cone is wound on the cable in a regular fashion and the cable end is connected to a connector, the pothead is assembled by inserting the prepared cable terminal section into the hollow insulator. After the sleeve and the insulator are connected, the pothead is filled with epoxy resin and cured to a substantially void free integral unit.

Figure 2:
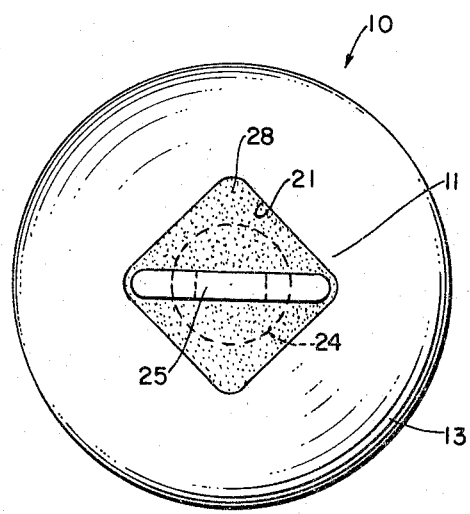

To further illustrate applicants' invention, a specific embodiment is described below with reference to the accompanying drawings wherein FIG. 1 is a vertical section of applicants' connected pothead, and FIG. 2 is the top view of the pothead of this invention.

Referring to the drawings, the pothead 10 comprises a hollow insulator tube 11 of ceramic material, such as a wet process porcelain. Other high grade insulation may be used in place of the porcelain. The insulator is circular in cross section and is provided with usual peripherally extending stress controlling flanges 13. The bottom of the insulator has a neck portion 14 designed to connect with an electrical conductive sleeve 12. The sleeve 12 is made of resinous plastic material which is rendered electrically conductive by providing a metallic coating on its outer surface (not shown). Other electrically conductive plastics, such as plastics containing finely dispersed carbon particles, may also be used.

The sleeve 12 is in the general shape of an inverted cylindrical bell with a slightly tapered wall in the body and more steeply tapered end portion 16 to form an entrance 17 engaging the periphery 18 of the cable 19. The tapered entrance is specially designed that it can be adapted to fit a variety of different size cables by cutting the tapered plastic entrance at different points to give the required opening. The electrically conductive sleeve serves as an electrostatic shield which grounds to the metallic sheath 18 or carried to a ground connection when non-metallic sheath cable is employed. The upper portion of the sleeve 12 is frictionally connected to the neck portion 14 of the porcelain insulator 11. An exact fit in this joint is not required. Generally, a smaller sleeve inside diameter than the outside diameter of the neck portion will provide a tighter joint.

The insulator 11 has a bore 20 extending therethrough. The bore is substantially in cylindrical shape throughout the length of the insulator with the exception of its top portion 21 which has a non-circular cross section and serves as an exit of the pothead. The internal wall of bore 20 is slightly tapered with a larger diameter at its bottom, and its lower edge 22 is rounded off. The tapered and smooth internal bore 20 is necessary for a bubble-free cast which will be explained in greater detail in subsequent discussion. When the insulator is connected to the sleeve 12, the bore 20 and sleeve 12 form jointly an internal chamber to surround the terminal section of the electrical cable 19. The end of the cable is connected to a connector 23 which is designed to support the entire termination and is made of a long barreled lug with a cylindrical lower portion 24 and a substantially flat upper portion 25 protruding out of the exit of the pothead 21. The cylindrical lower portion 24 of the connector has an opening 26 which permits the insertion of the cable end 27 and so as to allow the cable connector to be crimped or otherwise fastened to the conductor. It is necessary that the cable be cast concentrically in the insulator tube and the sleeve, which can be accomplished readily using a non-circular exit such as shown in the drawings. This square shape exit 21 of the pothead permits the flat portion 25 of the connector 23 to be positioned diagonally, as shown in FIG. 2, which prevents the rotating movement of the connector as well as the cable and at the same time concentrically positions the cable. The flat end portion of the connector protrudes out of the exit 21, leaving sufficient space to permit the use of the exit for filling the epoxy resin into the chamber through opening 28. The exit 21 and the connector 23 should be the sizes that a snug fit is obtained.

A stress relief cone 29 is provided at the lower portion of the terminal section of the cable. This cone is not required for cables which are not shielded or do not have metallic jackets. Installation of this type with the terminal of this invention is further simplified. For the high voltage cable where a stress relief cone is a necessity, a hand-wound stress relief cone is preferred and is made from insulating tape. For low voltage paper oil cables the tape may be made from impregnated paper or varnished cambric. A metal shielding tape 30 is wound from the cable shield 18 to the high point of the stress relief cone. For oil impregnated cables they require a wrapping of insulating material 31 from the jacket to the connector to act as an oil dam to stop the flow of the oil out of the cable, particularly if the terminal is at a low point of the cable system. Excellent results are obtained by the use of unsaturated polyester tape as an oil dam. A preformed metal stress cone with holes may be used in place of the hand-wound stress cone, which also has to extend to the metal sheath to avoid a floating circuit.

The chamber formed by the connected insulator and the sleeve that surrounds the cable is filled with relatively low viscosity epoxy resin 32 which is exothermically cured within the chamber to provide a substantially void free dielectric element. The high adhesion of the epoxy resin bonds all the components into an integral unit. To facilitate escape of gas bubbles formed during the exothermic reaction, a resin-curing agent system with lowest practical viscosity should be used. While we find the epoxy resin with viscosity below about 900 centipoises at ambient temperature to be satisfactory, a viscosity of about 350 to 450 centipoises is preferred. Commercially available epoxy resins that are applicable to applicants' invention are the diglycidyl ether of bisphenol A type which has an epoxy equivalent range from 140 to 400 and an average molecular weight from 300 to 400. Other epoxy resins that fit the requirements, such as glycidyl ethers of glycerol and glycidyl ethers of bisphenol F, and epoxylated novolacs may also be used.

In curing the low viscosity resin, the pothead is maintained at a vertical position with the connector pointing upward. The special design of this pothead provides the greatest volume of epoxy in its sleeve as compared to the volume in the insulator. As previously stated, the bore of the insulator is deliberately made with the inside diameter at the top less than that at the bottom. This tapered bore with smooth interior allows the escape of the gas bubbles formed during the exotherm. Since epoxy cures faster in larger volumes, the resin in the sleeve gels first permitting the gas bubbles formed during the curing to flow upward through the ungelled epoxy at the upper portion of the pothead. The progressive lessening of inside diameter of the bore facilitates the progressively upward curing action, thus providing a curing mechanism for a bubble-free cast. Curing the epoxy resin in this manner eliminates the problem of shrinkage associated with the epoxy resin. The uncured upper portion of the resin will supply the lower portion of the resin to compensate for the loss due to shrinkage. By overfilling the chamber and maintaining a dam at the exit of the insulator to hold the excess resin, the shrinkage problem can be eliminated. When the resin is hardened, the excess can be cut to a pointed shape which would permit shedding of water.

To test its operability, a 15 kv.-insulated cable was terminated at both ends with an epoxy filled pothead in accordance with this invention. A clear, unfilled 100% solids epoxy resin of the diglycidyl ether of bisphenol A type and a primary aliphatic amine hardener system were used for the pothead. The viscosity of the resin-hardener system was about 350–450 cps. at 75° F. which has a pot life of 20–30 minutes, and cured within 24 hours at room temperature. The physical and the electrical properties of the cured epoxy resin in the pothead were as follows:

| | |
|---|---|
| Shore D hardness | 60 to 70 at 75° F. |
| Gel time | 30–45 minutes. |
| Dielectric strength | >400 volts/mil. |
| Volume resistivity | >2×10$^{12}$ ohm-cm. |
| Moisture absorption 24 hours in H$_2$O | 0.7–2.0% at 75° F. |

The terminals and the entire cable were placed outdoors where they would be subject to the heat of the direct sunlight during the month of June. A current of 300 amperes (AC) was applied for 8 hours during the day. The cable was tested for 20 days (20 heating cycles). A continuous voltage of 15 kv. from conductor to ground was applied during this period with the ambient temperature during the day reaching up to 90° F. in the shade. It was found that the terminals performed satisfactorily under all types of weather conditions. A similar test was made in the winter months when the ambient temperature approaches 0° F. Again, the terminal performs exceedingly well during this period.

We claim:

1. A pothead terminating an electrical cable comprising an insulator having an axial bore extending therethrough and surrounding the end portion of said cable, a flexible resinous sleeve surrounding a portion of said cable immediately adjacent to said end portion of the cable, said sleeve having a tapered end engaging the periphery of said cable and an opposite end connected to said insulator forming jointly with said insulator a chamber surrounding the terminal section of the cable, a connector connected to the end of the cable and protruding out of said insulator, and a substantially void free exothermically cured low viscosity epoxy resin filling said chamber and bonding the cable, the sleeve, and the insulator to form an integral unit.

2. A pothead terminating an electrical cable comprising an insulator having a substantially cylindrical axial bore extending therethrough and surrounding the end portion of said cable, an electrical conductive sleeve surrounding a portion of said cable immediately adjacent to said end portion of the cable, said sleeve having a tapered end engaging the periphery of said cable and an opposite end frictionally connected to the outer periphery of said insulator forming jointly with said insulator a chamber surrounding the terminal section of the cable, a connector connected to the end of the cable and protruding out of said insulator, and a substantially void free exothermically cured low viscosity epoxy resin filling said chamber and bonding the cable, the sleeve, and the insulator to form an integral unit.

3. A pothead terminating an electrical cable comprising an insulator having a substantially cylindrical axial bore extending therethrough and surrounding the end portion of said cable, said bore having a tapered internal surface with progressively increasing diameter from the exit of said bore to its entrance, an electrical conductive sleeve surrounding a portion of said cable immediately adjacent to said end portion of the cable, said sleeve having a tapered end engaging the periphery of said cable and an opposite end frictionally connected to said insulator forming jointly with said insulator a chamber surrounding the terminal section of the cable, a connector connected to the end of the cable and protruding out of said insulator from the exit of the bore, and a substantially void free exothermically cured low viscosity epoxy resin filling the chamber and bonding the insulator, the cable, the cable connector, and the sleeve into an integral unit.

4. A pothead terminating an electrical cable comprising an insulator having a substantially cylindrical axial bore extending therethrough and surrounding the end portion of said cable, said bore having a tapered internal surface with progressively increasing diameter from the exit of said bore to its entrance, an electrical conductive sleeve surrounding a portion of said cable immediately adjacent to said end portion of the cable, said sleeve having a tapered end engaging the periphery of said cable and an opposite end frictionally connected to said insulator forming jointly with said insulator a chamber surrounding the terminal section of the cable, a connector with substantially flat upper end portion connected to the end of the cable and with its flat upper end portion protruding out of said insulator from the exit of the bore, said exit being substantially non-circular in cross section capable of positioning said connector to provide a concentrical arrangement between said cable and said insulator and sleeve, and further limiting the movement of said connector, and a substantially void free exothermically cured low viscosity epoxy resin filling the chamber and bonding the insulator, the cable, the cable connector, and the sleeve into an integral unit.

5. A pothead terminating an electrical cable comprising an insulator having a substantially cylindrical axial bore extending therethrough and surrounding the end portion of said cable, said bore having a tapered internal surface with progressively increasing diameter from the exit of said bore to its entrance, an electrical conductive resinous sleeve surrounding a portion of said cable immediately adjacent to said end portion of the cable, said sleeve having a tapered end engaging the periphery of said cable and an opposite end frictionally connected to said insulator forming jointly with said insulator a chamber surrounding the terminal section of the cable, a connector connected to the end of the cable and protruding out of said insulator, and a substantially void free exothermically cured low viscosity epoxy resin filling said chamber and bonding the cable, the sleeve, the cable connector and the insulator into an integral unit, said epoxy resin having a viscosity below about 900 centipoises at ambient temperature before curing.

6. A pothead of claim 5 wherein said epoxy resin has a viscosity about 350–450 centipoises at ambient temperature before curing.

7. A pothead of claim 5 wherein said electrical conductive resinous sleeve is an organic plastic sleeve having a metallic coating on its outer surface.

References Cited
UNITED STATES PATENTS

| | | |
|---|---|---|
| 2,287,365 | 10/1945 | Thomson. |
| 2,903,501 | 9/1959 | O'Mara _____ 174—19 |

FOREIGN PATENTS

| | | |
|---|---|---|
| 866,043 | 4/1961 | Great Britain. |
| 893,828 | 4/1962 | Great Britain. |
| 920,247 | 3/1963 | Great Britain. |
| 969,735 | 9/1964 | Great Britain. |
| 467,388 | 12/1951 | Italy. |

OTHER REFERENCES

Lemmerich et al.: Germany ptd. application No. 1,086,777 (publ. 8–11–1960).

LEWIS H. MYERS, *Primary Examiner.*

J. RUGGIERO, *Assistant Examiner.*